Nov. 12, 1968 R. FORMAN 3,411,109

THERMIONIC DIODE OSCILLATOR

Filed Sept. 6, 1966 2 Sheets-Sheet 1

INVENTOR.
RALPH FORMAN

BY John F. Hohmann

ATTORNEY

Nov. 12, 1968 R. FORMAN 3,411,109

THERMIONIC DIODE OSCILLATOR

Filed Sept. 6, 1966 2 Sheets-Sheet 2

INVENTOR.
RALPH FORMAN
BY
John F. Hohmann
ATTORNEY 3,411,109

THERMIONIC DIODE OSCILLATOR

Ralph Forman, Rocky River, Ohio, assignor to Union Carbide Corporation, a corporation of New York Continuation-in-part of application Ser. No. 182,605, Mar. 20, 1962. This application Sept. 6, 1966, Ser. No. 584,294
8 Claims. (Cl. 331—126)

ABSTRACT OF THE DISCLOSURE

An oscillator is constructed by first obtaining a thermionic diode whose operational characteristics are such that a negative resistance region exists in the anode current-anode voltage characteristic of the diode, and then adjusting the external load circuit so that the load line intersects the negative resistance portion of this characteristic at two points.

This application is a continuation-in-part of application Ser. No. 182,605 filed Mar. 20, 1962, which is in turn a continuation-in-part of application Ser. No. 147,608 filed Oct. 25, 1961, both now abandoned.

The present invention relates generally to an electronic oscillator and, more particularly, to a gas-filled diode having an anode current-anode voltage characteristic with a negative-resistance region.

Heretofore, a great variety of electronic oscillators have been proposed employing vacuum triodes, tetrodes, and other multi-element tubes. Under certain conditions, such devices have displayed characteristics of negative resistance. More recently, a solid-state diode has been developed which displays negative-resistance characteristics and, therefore, can be used as an oscillator.

It is the main object of the present invention to provide a gas-filled diode having a negative-resistance characteristic.

It is another object of the invention to provide a gas-filled diode for oscillating an electrical signal.

Other aims and advantages of the invention will be apparent from the following description and appended claims.

As used herein, the term "° C." as applied to temperature figures above 800 refers to ° C. brightness as measured by an optical pyrometer.

Figures 1, 2:
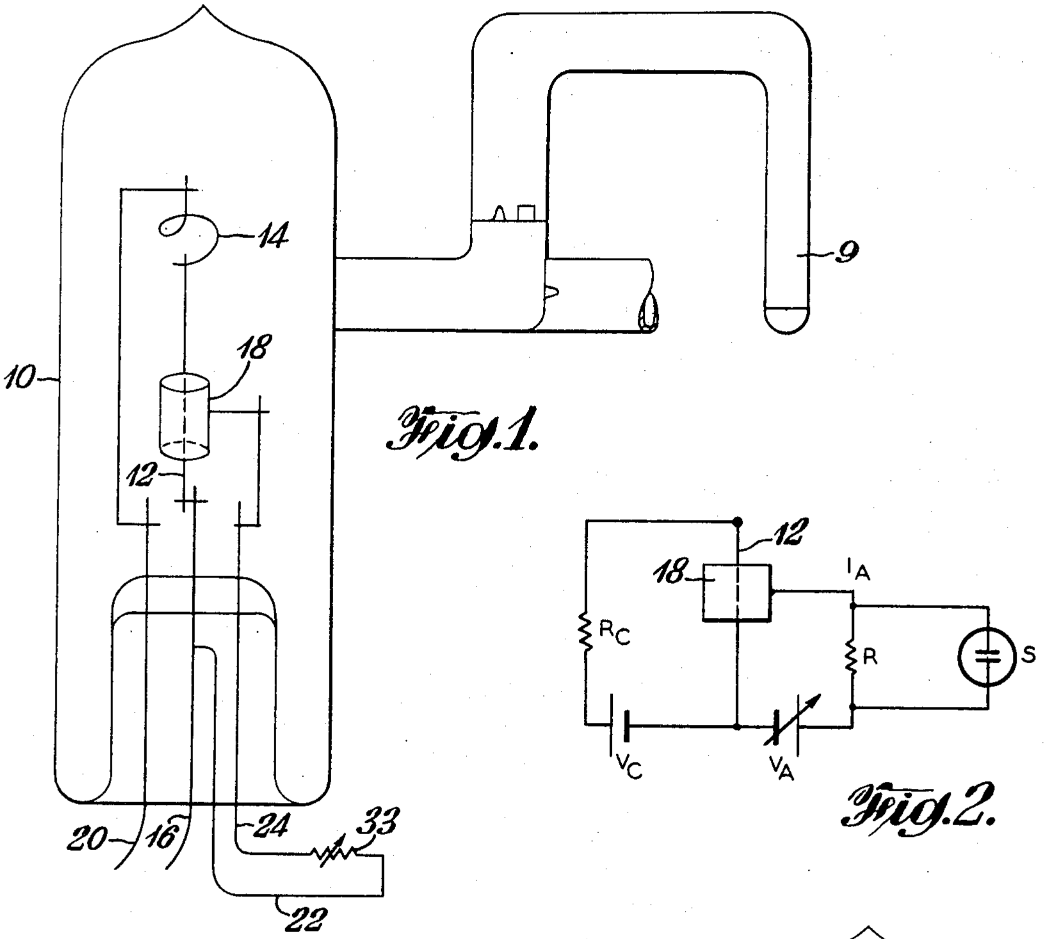
FIG. 1 is a schematic diagram of a preferred form of the inventive apparatus.
FIG. 2 is a diagram of a circuit for determining when a negative-resistance region is present in the anode current-anode voltage characteristic of the apparatus of FIG. 1.

In accordance with the present invention, there is provided an electronic oscillator comprising a cathode and an anode disposed in an ionizable gas containing at least one gas selected from the group consisting of krypton, argon, xenon, and isotopes thereof, the cathode being electrically connected to the anode through an external load circuit and a direct-current source, the temperature of the cathode being sufficiently high to effect thermionic emission therefrom; and a source of ionizing radiation for irradiating the ionizable gas, the pressure of the gas, the dose rate effected by the ionizing radiation, and the amount of krypton, argon, xenon and isotopes thereof in said ionizable gas being sufficient to produce a negative-resistance region in the anode current-anode voltage characteristic, the impedance of the external load being such that the load line therefor intersects the negative-resistance portion of the anode current-anode voltage characteristic in two points. The ionizing radiation employed in the inventive converter is preferably at least one type of charged particles selected from the group consisting of beta particles, protons, deuterons, tritons, alpha particles, and high energy electrons.

A load line is a line which intersects the anode voltage axis at the voltage of the D-C input and whose slope is determined by the impedance of the external load. The load line can be varied by changing the load resistance or the magnitude of the D-C input.

The ionizing radiation employed in the present invention may be produced by any convenient process. For example, beta particles may be obtained from beta decay of a radioactive nuclide such as krypton-85, and high energy electrons may be obtained from gamma radiation as a result of the photoelectric process, Compton scattering, or pair production. High-energy protons or deuterons may be produced as a result of collisions of fast neutrons in a nuclear reactor with hydrogen or deuterium. High-energy protons and tritons may be produced in a nuclear reactor by the absorption of slow neutrons in a material having nuclei with a high cross section for an n,p or n,alpha reaction. Alpha particles may be obtained from alpha decay of radioactive nuclides such as radon.

A negative-resistance region in the anode current-anode voltage characteristic is a region where an increase in the anode voltage results in a decrease rather than an increase in the anode current. In the present invention, a negative-resistance region is created in the anode current-anode voltage characteristic by employing krypton, argon, xenon, and/or isotopes thereof as at least a portion of the ionizable gas. Some forms of these gases, such as krypton-85, may also serve as the source of ionizing radiation. The only requirement on the amount of krypton, argon, and/or xenon employed is that it be sufficient to produce a negative-resistance region in the anode current-anode voltage characteristic at the particular gas pressure and dose rate employed. It is generally preferred to use one or more of the three gases, including isotopes thereof, as at least 99% by volume of the ionizable gas. Of course, in the case of fission-product krypton, 100% of the gas is krypton and krypton isotopes. The amount of krypton, argon, xenon, and isotopes thereof required in the ionizable gas to produce a negative-resistance region depends somewhat on the ion concentration in the space between the cathode and anode.

The rate of formation of gas ions in the space between the cathode and anode is determined mainly by the pressure and type of the ionizable gas around the cathode and anode, and the dose rate of the ionizing radiation, i.e., the energy, type, and flux of ionizing particles employed. The concentration of ions is also dependent on the rate of recombination. By varying these factors, the ion concentration in the gas around the cathode can be increased to the level required to make the current output of the converter temperature dependent. In general, the ion concentration increases with increasing gas pressure, increasing dose rate, and decreasing rate of recombination. When the range of the ionizing particles exceeds the dimensions of the vessel, the ion concentration is somewhat dependent on the geometry of the vessel.

A theoretical discussion of the phenomenon of negative resistance regions in the operating characteristics of thermionic diodes will be found in the following articles: R. Forman, Physical Review, vol. 128, page 1487 (1962); R. Forman et al., ibid., page 1493; and R. Forman, Journal of Applied Physics, vol. 36, page 1344 (1965).

Once the negative-resistance region has been created, the device can be used as an electronic oscillator by electrically connecting the cathode to the anode through an external load circuit and a direct-current source and adjusting the impedance of the external load so that the load line therefor intersects the negative-resistance portion of the anode current-anode voltage characteristic in two points. As used herein, the phrase "intersects in two points" includes situations where the load line coincides with the negative-resistance portion of the curve over a finite distance. The frequency of the output signal of the oscillator may be varied by varying the distance between the cathode and anode, by varying the dimensions of the oscillator, by varying the pressure of the gas, by varying the load circuit, or by any other suitable means.

Thus, the oscillator of this invention is constructed by first obtaining a thermionic diode whose operational characteristics are such that a negative resistance region exists in the anode current-anode voltage characteristic of the diode, and then adjusting the external load circuit so that the load line intersects the negative resistance portion of this characteristic at two points, as described hereinabove. In operation, the oscillator of this invention exhibits all of the structural features and operational characteristics of a thermionic diode, plus the oscillatory output obtained by proper selection and adjustment of the external load circuit.

The source of the ionizing radiation may be the gas between the cathode and the anode, the cathode, the anode, or in any other form suitable for ionizing the gas. However, it is generaly preferred to have the source of ionizing radiation in the form of a gas between the cathode and anode. The radiating gas may itself be the ionizable gas, or it may be mixed with other ionizable gases. Also, more than one type of radioactive gas may be employed.

One source of ionizing radiation suitable for use in the present invention is fission-product krypton. As used herein, the term "fission-product krypton" refers to a gas containing about 5% by volume krypton-85 and about 95% by volume stable fission-product krypton isotopes when fresh. Of course, as the fission-product krypton becomes older, the proportion of krypton-85 therein slowly decreases. The krypton-85 decays to rubidium-85, which is a stable isotope of rubidium. The fission-product krypton serves both as the ionizable gas and as the source of ionizing radiation (beta particles), and also makes possible the negative-resistance region in the anode current-anode voltage characteristic. Fission-product krypton is a relatively abundant and easily isolated fission product having a specific activity of 21 curies per gram when fresh. Krypton-85 is a nearly pure (99.4%) beta emitter with a half-life of 10.5 years. When fresh fission-product krypton is employed in the present invention, a gas pressure of between 10 and 150 mm. of mercury is usually required to produce a negative-resistance region in the anode current-anode voltage characteristic. The negative-resistance region usually disappears at pressures below 10 and above 150 mm. of mercury in the case of fission-product krypton. It is generally preferred to use a pressure of at least 130 mm. of mercury for greater efficiency.

Another source of ionizing radiation suitable for use in the present invention is radon, which is an alpha-emitting gas. About 1.0 millicurie of radon 222 and its short-lived decay products in natural krypton at a pressure of about 20 mm. of mercury produces a negative-resistance region.

Still another source of ionizing radiation is a source of gamma rays, such as cobalt-60, in combination with a diode filled with a rare gas. Absorption of gamma rays from the cobalt-60 or reactor in the walls (such as glass) and electrodes of the diode produces high-energy electrons which, in turn, ionize the rare gas within the diode. In this embodiment, the gamma-ray source may be located completely outside the gas to be ionized. It is preferred to have the dose rate from the high-energy electrons between about 0.05 and about 10,000 megarads per hour, and the rare gas, such as krypton, within the diode should be at a pressure of 1 to 150 millimeters of mercury. However, it is to be understood that the lowest specified pressure may not be used with the lowest specified dose rate. For example, with krypton at a pressure of one millimeter, a dose rate of at least 100 megarads per hour is usually required to produce a negative-resistance region. Also, the dose rates and pressures required vary somewhat with the different gases. For example, xenon produces a negative-resistance region at a slightly lower pressure than krypton at a given dose rate. However, it is a simple matter to adjust the dose rate and pressure within the given ranges until the negative-resistance region appears.

Another source of ionizing radiation which can be used in the present invention, although it is of little practical value, is a source of slow neutrons, such as a nuclear reactor, in combination with a material having nuclei with a high cross section for an n,p (neutron in, proton out) reaction or n,alpha (neutron in, alpha particle out) reaction. Examples of such materials are boron-10, lithium-6, and helium-3. The boron and lithium are solids and may be disposed within the ionizable gas in the diode in the form of a coating on the anode or on the inner walls of the diode container. Such coatings may be formed, for example, by electroplating. The boron-10 or lithium-6 need not be used in elemental form, but may be contained in a suitable compound, such as $TiB_2$. Helium-3 is a gas and may be mixed with the ionizable gas, preferably in an amount such that the resulting gas mixture contains less than about 10% by volume helium-3. Absorption of slow neutrons from the reactor or other neutron source in helium-3, for example, produces high-energy protons and tritons with kinetic energies of about 0.6 mev. and 0.2 mev., respectively. In a reactor having a slow neutron flux of $10^{12}$ neutrons/cm.$^2$-sec., pure helium-3 at a pressure of one atmosphere in a container having a radius greater than the 6-cm. range of the protons would be subjected to a dose rate of $4\times10^{10}$ rads per hours (in the center of the container) from the products of the n,p reaction. With identical conditions in a vessel having a radius of one centimeter, the dose rate would be about $10^{10}$ rads per hour and the rate of ion formation would be $10^{15}$ ions/cc.-sec. A dose rate of 0.1 to 10,000 megarads per hour is usually sufficient to make the current output temperature dependent. It is preferred to use a rare gas, such as krypton, as the ionizable gas, and the preferred pressure range for the ionizable gas is from about 0.1 to about 200 millimeters of mercury. As explained above in connection with the gamma-ray source, it is to be understood that the lowest specified pressure may not usually be used with the lowest specified dose rate, but that these two conditions are simply varied within the given ranges until the negative-resistance region appears.

The cathode employed in the present process and apparatus can be thoriated tungsten, an oxide cathode material (e.g., nickel wire sprayed with $BaCO_3$—$SrCO_3$ and a binder), tungsten, or any other suitable electron-emitting material. When the cathode materials mentioned above are employed, suitable anode materials are tantalum, molybdenum, and nickel. The only requirement on the cathode temperature is that it be sufficiently high to achieve effective thermionic emission therefrom. Although the spacing between the cathode and anode is not narrowly critical to the operability of the present invention, the efficiency of the oscillator may be varied to some extent by varying the spacing.

In addition to the ions produced by emanations from the radioactive material, there may be some gas ions produced by thermal ionization.

A preferred embodiment of the process and apparatus of the invention will now be described in greater detail by referring to the drawings.

A schematic diagram of the novel oscillator is shown in FIG. 1. A radioactive gas is contained at the required pressure in a cylindrical glass envelope 10. A cathode filament 12 is disposed concentrically within the envelope and the gas therein and is supported at the top by a tantalum spring 14 and an electrically conductive lead 20 and at the bottom by an electrically conductive lead 16. The cathode 12 is heated to the temperature required to achieve effective thermionic emission therefrom by an electrical current passed through leads 16 and 20 from an external power source (not shown). An anode 18 in the form of a cylindrical sleeve surrounds the cathode filament at a distance of about one cm. therefrom. Lead 22 from the cathode 12 and lead 24 from the anode connect the tube to an external load 33, and a D-C power supply (not shown).

In order to determine the exact gas pressure, dose rate, and amount of krypton, argon, xenon, and/or isotopes thereof required to produce a negative-resistance region in the anode current-anode voltage characteristic of the oscillator of FIG. 1, the device is placed in the circuit shown in FIG. 2. Referring to FIG. 2, $V_c$ is the voltage required to heat the cathode 12 and is connected across the cathode through a resistance $R_c$. A variable voltage $V_A$ is then connected across the anode 18 through a load resistance R, and the resulting current $I_A$ is measured as $V_A$ is varied. The oscilloscope S in FIGURE 2 provides a convenient means for determining the current $I_A$. The osilloscope S measures the voltage across the resistance R, this voltage being shown on the oscilloscope trace. The current $I_A$ is then easily computed from the resistance R and the voltage displayed on the oscilloscope. By plotting the $I_A$–$V_A$ characteristic at increasing gas pressures, dose rates, and/or concentrations of krypton, argon, or xenon, it can be determined at what conditions the characteristic acquires a negative-resistance region. Of course, when fission-product krypton is employed as the ionizable gas in the inventive oscillator, there is no question of what amount of krypton, argon, and/or xenon is required to produce a negative-resistance region (the gas is 100% krypton and krypton isotopes), and the only variable is the gas pressure. Thus, the $I_A$–$V_A$ curve can be plotted at increasing pressures of the fission-product krypton until the characteristic acquires a region of negative resistance.

Figure 3:
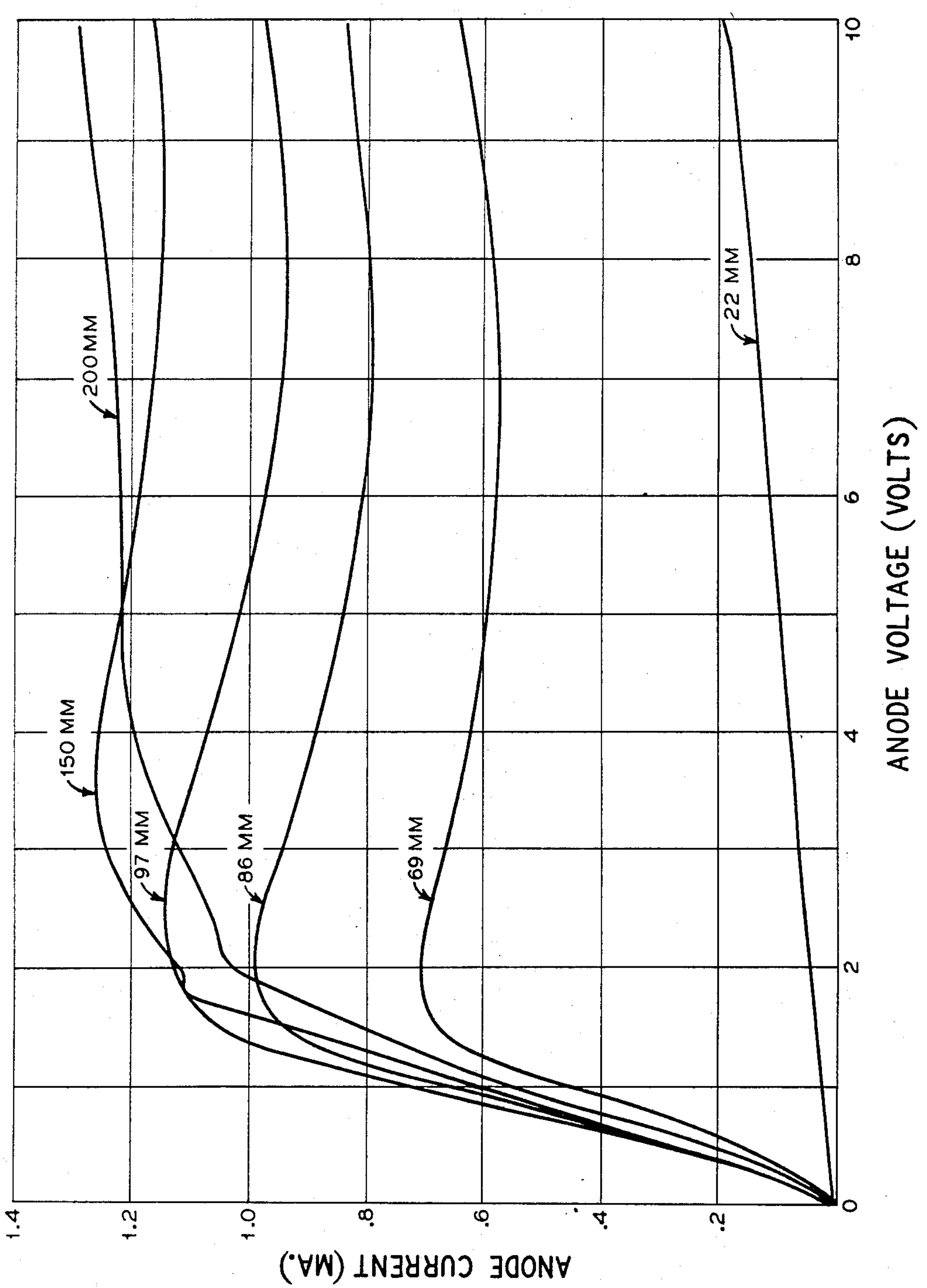
FIG. 3 is a graph showing the anode current-anode voltage characteristics obtained with various pressures of fission-product krypton in the apparatus of FIG. 1.

In an example of the aforedescribed process for determining the gas pressure required to produce a region of negative-resistance, a tube such as that shown in FIG. 1 was prepared with a thoriated tungsten cathode filament and a tantalum anode sleeve. The tube was about 6 inches long and about 40 mm. in diameter with the electrodes located in the center of the tube. The tube was placed in the circuit shown in FIG. 2, and the anode current-anode voltage characteristics were taken in various pressures of fission-product krypton. The gas pressure was varied by varying the temperature around a cold finger, such as in FIG. 1. The temperature of the cathode was about 1500° C., while the temperature of the anode was less than 500° C. The spacing between the cathode and anode was about 0.5 cm. A few of the $I_A$–$V_A$ curves obtained are shown in FIG. 3, where the ordinate is the current $I_A$ indicated in FIG. 2, and the abscissa is the voltage $V_A$ indicated in FIG. 2. It can be seen that the $I_A$–$V_A$ curves obtained at pressures of 69, 86, 97, and 150 mm. exhibited negative-resistance regions, while the curves obtained at pressures of 22 and 200 mm. showed no negative-resistance portion. No negative-resistance region was produced at the pressure of 22 mm. in this case mainly because the dimensions of the tube were smaller than the range of the ionizing particles. As the dimensions of the vessel are increased, the lower limit of the operable pressure range decreases, and when the vessel dimensions are greater than the range of the ionizing particles, a pressure as low as 10 mm. of mercury will generally produce a negative-resistance region.

The same process described above for determining the gas pressure required to produce a negative-resistance region may be used to determine the dose rate and/or the amount of krypton, argon, or xenon required to produce a negative-resistance region when a gas or radioactive material other than fission-product krypton is employed, i.e., the $I_A$–$V_A$ curve can be plotted at increasing dose rates or increasing concentrations of one or more of the three gases until a negative-resistance portion is produced in the curve.

After the conditions for creating a negative-resistance region have been established, the device can be used as an oscillator by electrically connecting the cathode and anode through a D-C source (input) and an external load, and varying the impedance of the load until the load line therefor intersects the negative-resistance portion of the $I_A$–$V_A$ curve in two points. The exact impedance value required to make the load line intersect the negative-resistance portion of the curve in two points can be determined by connecting an oscilloscope S (see FIG. 2) across the load and varying the impedance of the load until an alternating signal is observed on the oscilloscope or by drawing the desired load line and calculating the required impedance.

Figure 4:
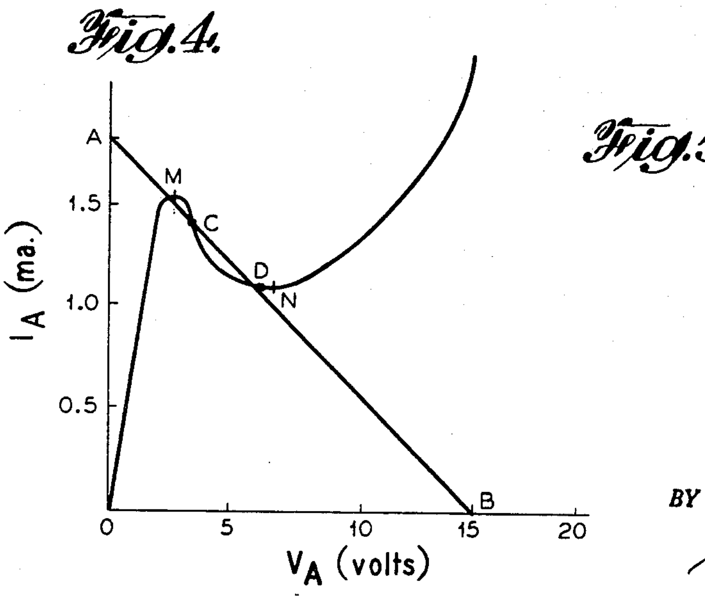
FIG. 4 is a graph showing an anode current-anode voltage characteristic obtained with fission-product krypton in the apparatus of FIG. 1 and a load line intersecting the negative-resistance portion of the characteristic in two points.

The $I_A$–$V_A$ characteristic obtained from a tube containing fission-product krypton at a pressure of about 40 mm. of mercury (thoriated tungsten cathode and tantalum anode) is shown in FIG. 4. It can be seen that portion MN of the curve is the negative-resistance portion, i.e., an increase in anode voltage in that region produces a decrease rather than an increase in anode current. When the load resistance was adjusted to about 8000 ohms, the load line AB intersected the negative-resistance portion of the $I_A$–$V_A$ curve in two points (C and D), and an oscillating output signal was produced. If the load impedance was adjusted so that the load line coincided with the negative-resistance portion of the curve over a finite distance, the oscillator output was a sine wave. If the load line intersected the negative-resistance portion of the curve in two points, as line AB described above, the output was a more complex alternating signal. In addition to resistive elements, reactive elements such as inductances and capacitances may be employed.

Figure 5:
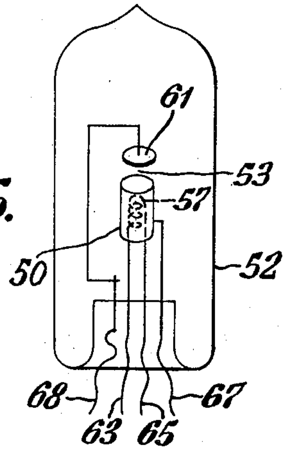
FIG. 5 is a schematic view of a modified embodiment of the inventive apparatus.

A modified embodiment of the inventive apparatus is shown in FIG. 5. This embodiment comprises a cathode 50, which is indirectly heated by the heating coil 57, and a planar anode 61 disposed above the cathode 50 so as to define a space 53 therebetween. The entire cathode-anode assembly is surrounded by a glass envelope 52, which is preferably filled with fission-product krypton at a pressure between 10 and 150 mm. of mercury. Alternatively, the envelope 52 could be filled with krypton, argon, and/or xenon and a radioactive cathode material employed. In such a case, the same procedure outlined previously could be used to determine the exact gas pressure, dose rate, and amount of krypton, argon, and xenon required to produce a negative-resistance region. The heating coil 57 is heated by electrical current passed through conductors 63 and 65 from a suitable power source (not shown), and the cathode and anode are connected to an external load through conductors 67 and 68, respectively.

While various specific forms of the present invention have been illustrated and described herein, it is not intended to limit the invention to any of the details herein shown, but only as set forth in the appended claims.

What is claimed is:

1. An electronic oscillator comprising (1) within a container, a cathode and an anode disposed in an ionizable gas containing at least one gas selected from the group consisting of krypton, argon, xenon, and isotopes thereof, said cathode being electrically connected to said anode through an external load circuit and a direct-current source, the temperature of said cathode being sufficiently high to effect thermionic emission therefrom; (2) a source of ionizing radiation for irradiating the ionizable gas; (3) the pressure of said ionizable gas, the dose rate effected by said ionizing radiation, and the amount of krypton, argon, xenon, and isotopes thereof in said ionizable gas being sufficient to produce a negative-resistance region in the anode current-anode voltage characteristic; and (4) the impedance of said external load being such that the load line therefor intersects the negative-resistance portion of said anode current-anode voltage characteristic in two points.

2. An electronic oscillator as defined in claim 1 wherein said ionizing radiation is at least one type of charged particles selected from the group consisting of beta particles, high energy electrons, protons, deuterons, tritons, and alpha particles.

3. An eletronic oscillator as defined in claim 1 wherein said ionizable gas is at least 99% by volume of at least one gas selected from the group consisting of krypton, argon, xenon, and isotopes thereof.

4. An electronic oscillator comprising (1) within a container, a cathode and an anode disposed in an ionizable gas containing at least one gas selected from the group consisting of krypton, argon, xenon and isotopes thereof (at a pressure between about 10 and about 150 millimeters of mercury) said ionizable gas including gas emitting at least one type of ionizing radiation selected from the group consisting of beta particles, high energy electrons, protons, deuterons, tritons and alpha particles, said cathode being electrically connected to said anode through an external load circuit and a direct current source, the temperature of said cathode being sufficiently high to effect thermionic emission therefrom; (2) a source of ionizing radiation for irradiating said ionizable gas which comprises said emitting gas; (3) the pressure of said ionizable gas, the dose rate effected by said ionizing radiation, and the amount of krypton, argon, xenon, and isotopes thereof in said ionizable gas being sufficient to produce a negative-resistance region in the anode current-anode voltage characteristic; and (4) the impedance of said external load being such that the load line therefor intersects the negative-resistance portion of said anode current-anode voltage characteristic in two points.

5. The electronic oscillator of claim 4 wherein said ionizable gas is fission-product krypton at a pressure of at least 10 millimeters of mercury.

6. The electronic oscillator of claim 4 wherein said ionizable gas is radon.

7. An electronic oscillator comprising: (1) a cathode and an anode disposed in a gaseous mixture within a container, said gaseous mixture having a pressure between about 1 and about 150 millimeters of mercury and comprising a rare gas and at least one gas selected from the group consisting of krypton, argon, xenon, and isotopes thereof, said cathode being at a temperature sufficiently high to effect thermionic emission therefrom and being electrically connected to said anode through an external load circuit and a direct-current source; (2) means for irradiating said container and said cathode and anode with gamma rays so as to produce high-energy electrons which ionize said gaseous mixture, the dose rate of said high energy electrons being between about 0.05 and about 10,000 megarads per hour; (3) the pressure of said gaseous mixture, the dose rate of said high-energy electrons, and the amount of krypton, argon, xenon, and isotopes thereof in said gaseous mixture being sufficient to produce a negative-resistance region in the anode-current-anode voltage characteristic; and (4) the impedance of said external load circuit being such that the load line therefor intersects the negative-resistance portion of said anode current-anode voltage characteristic in two points.

8. The electronic oscillator of claim 7 wherein said means for irradiating said container and electrodes with gamma rays is cobalt-60.

References Cited

UNITED STATES PATENTS

| | | | |
|---|---|---|---|
| 1,561,001 | 11/1925 | Langmuir | 331—129 |
| 2,308,523 | 1/1943 | Llewellyn | 331—132 X |
| 2,747,121 | 5/1956 | Silver | 331—126 X |
| 3,126,511 | 3/1964 | Redemske et al. | 331—127 X |

ALFRED L. BRODY, *Primary Examiner.*

J. B. MULLINS, *Assistant Examiner.*